United States Patent [19]

Wood

[11] Patent Number: 4,463,416
[45] Date of Patent: Jul. 31, 1984

[54] PROGRAMMABLE AUTOMATIC CONTROLLER

[75] Inventor: Charles L. Wood, Muncie, Ind.

[73] Assignee: Ball Corporation, Muncie, Ind.

[21] Appl. No.: 396,853

[22] Filed: Jul. 9, 1982

Related U.S. Application Data

[63] Continuation of Ser. No. 63,716, Aug. 6, 1979, abandoned, which is a continuation of Ser. No. 898,211, Apr. 20, 1978, abandoned.

[51] Int. Cl.³ .......................... G06F 15/46; C03B 9/40
[52] U.S. Cl. ...................................... 364/143; 65/163; 364/473; 364/900
[58] Field of Search .............................. 364/140-147, 364/138, 139, 188, 189, 473, 476, 900 MS File; 65/158, 160-164, DIG. 13

[56] References Cited

U.S. PATENT DOCUMENTS

| Re. 29,188 | 4/1977 | Croughwell | 364/473 X |
|---|---|---|---|
| 2,736,852 | 2/1956 | Nelson | 364/474 |
| 2,866,506 | 12/1958 | Hierath et al. | 364/140 X |
| 3,365,623 | 1/1968 | Stacey | 364/900 |
| 3,445,639 | 5/1969 | Martens | 364/140 |
| 3,634,660 | 1/1972 | Moran et al. | 364/143 |
| 3,634,662 | 1/1972 | Slawson | 364/474 |
| 3,668,653 | 6/1972 | Fair et al. | 364/171 X |
| 3,760,251 | 9/1973 | Posl et al. | 364/138 X |
| 3,762,907 | 10/1973 | Quinn et al. | 65/163 X |
| 3,827,030 | 7/1974 | Seipp | 364/147 X |
| 3,923,147 | 12/1975 | Quinn | 364/140 X |
| 3,969,703 | 7/1976 | Kwiatkowski et al. | 364/144 X |
| 4,108,623 | 8/1978 | Cardenas-Franco | 65/138 X |
| 4,152,134 | 5/1979 | Dowling et al. | 364/138 X |

OTHER PUBLICATIONS

Kwiatkowski et al–"Electronic Timing of Automatic Glass-Blowing Machines"–IEEE Trans. on Industry Applications, Mar./Apr. 1976, pp. 165-171.

Primary Examiner—Joseph F. Ruggiero
Attorney, Agent, or Firm—Gilbert E. Alberding

[57] ABSTRACT

A programmable automatic controller for operating a section of a glassware forming machine having a plurality of components which operate in a timed or sequential relationship with one another. The controller includes a timing means for generating cycle clock pulses in synchronism with the operation of the machine, wherein the cycle clock pulses provide an instantaneous indication of the time elapsed in each cycle of operation of the machine. A random access memory (RAM) stores the relative times during each cycle of machine operation when each of the plurality of machine components are to be enabled and/or inhibited. When the time elapsed in a cycle corresponds to a component actuating time stored in the running storage, an actuating signal is generated by a comparator. This signal is coupled to a machine component addressing arrangement which provides a component enable or inhibit command signal to the addressed component whose actuating time compared to the cycle time elapsed. Accordingly, in a cycle of operation a plurality of component operating command signals are generated which command the respective machine components to initiate and terminate operation at preselected time intervals.

Means are provided for selectively varying the component actuating times stored in the RAM while the machine is stopped or in operation.

The controller is designed to operate directly next to the section it controls since its design employs a minimal number of components all able to function with a minimal amount of cooling.

14 Claims, 11 Drawing Figures

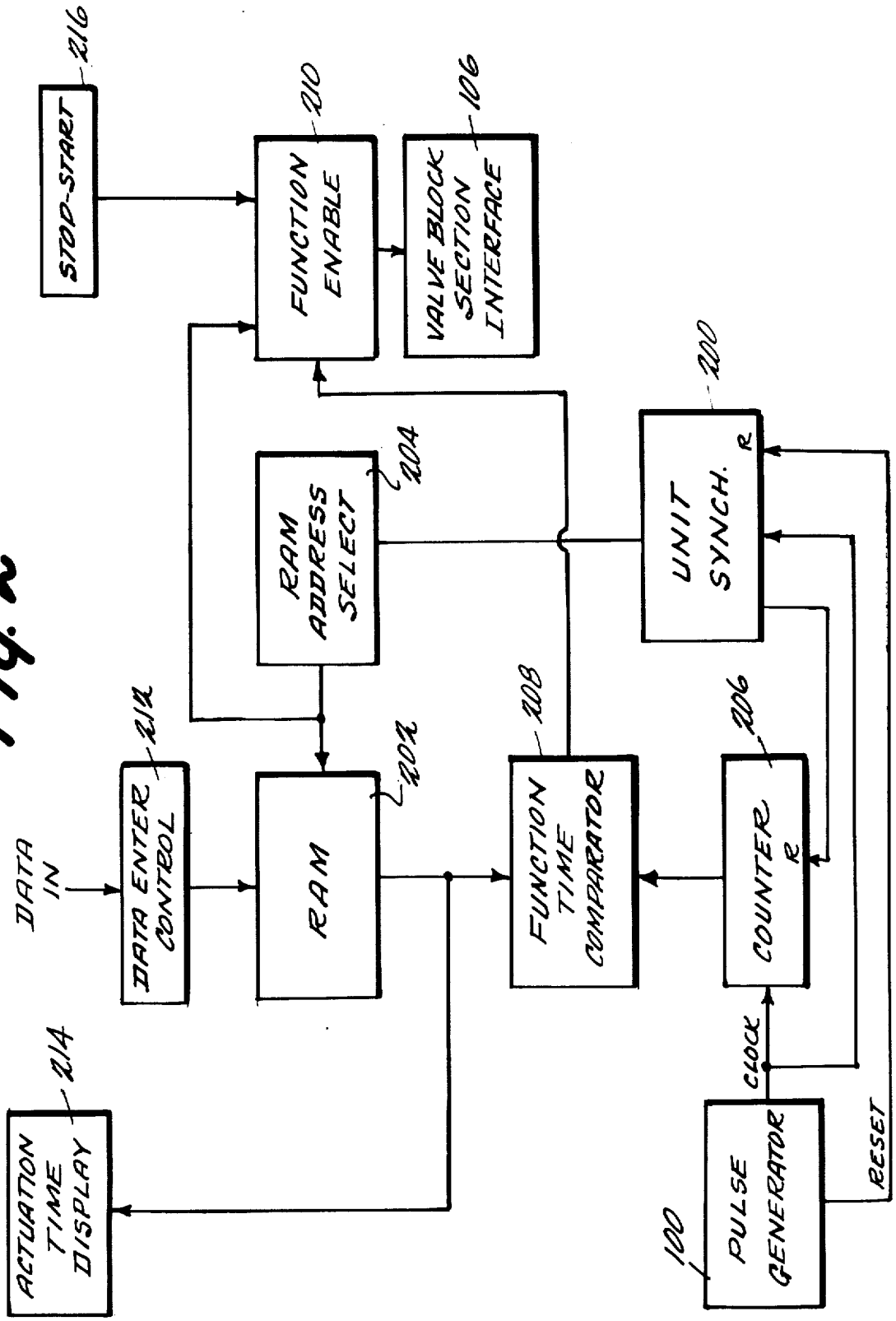

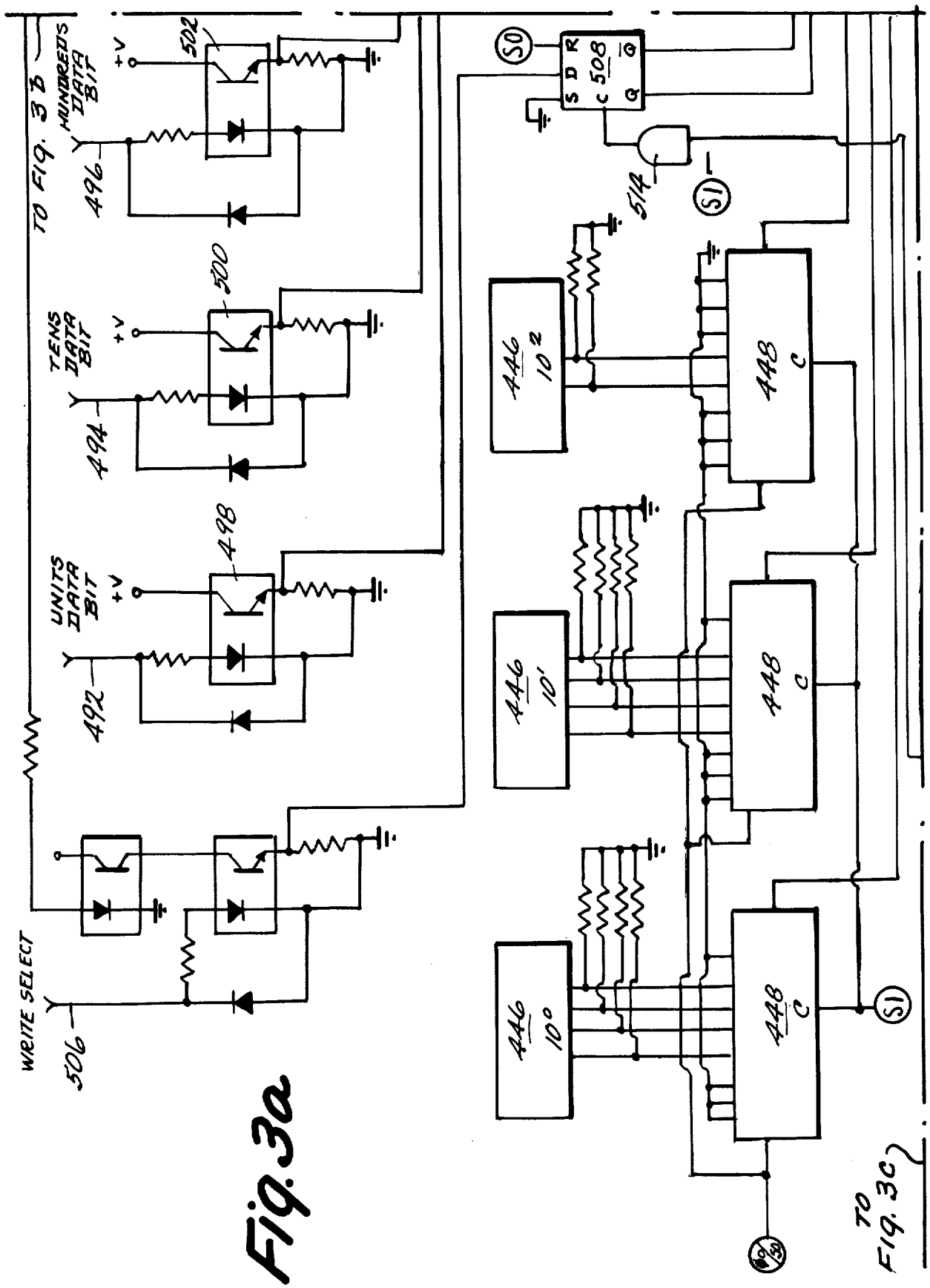

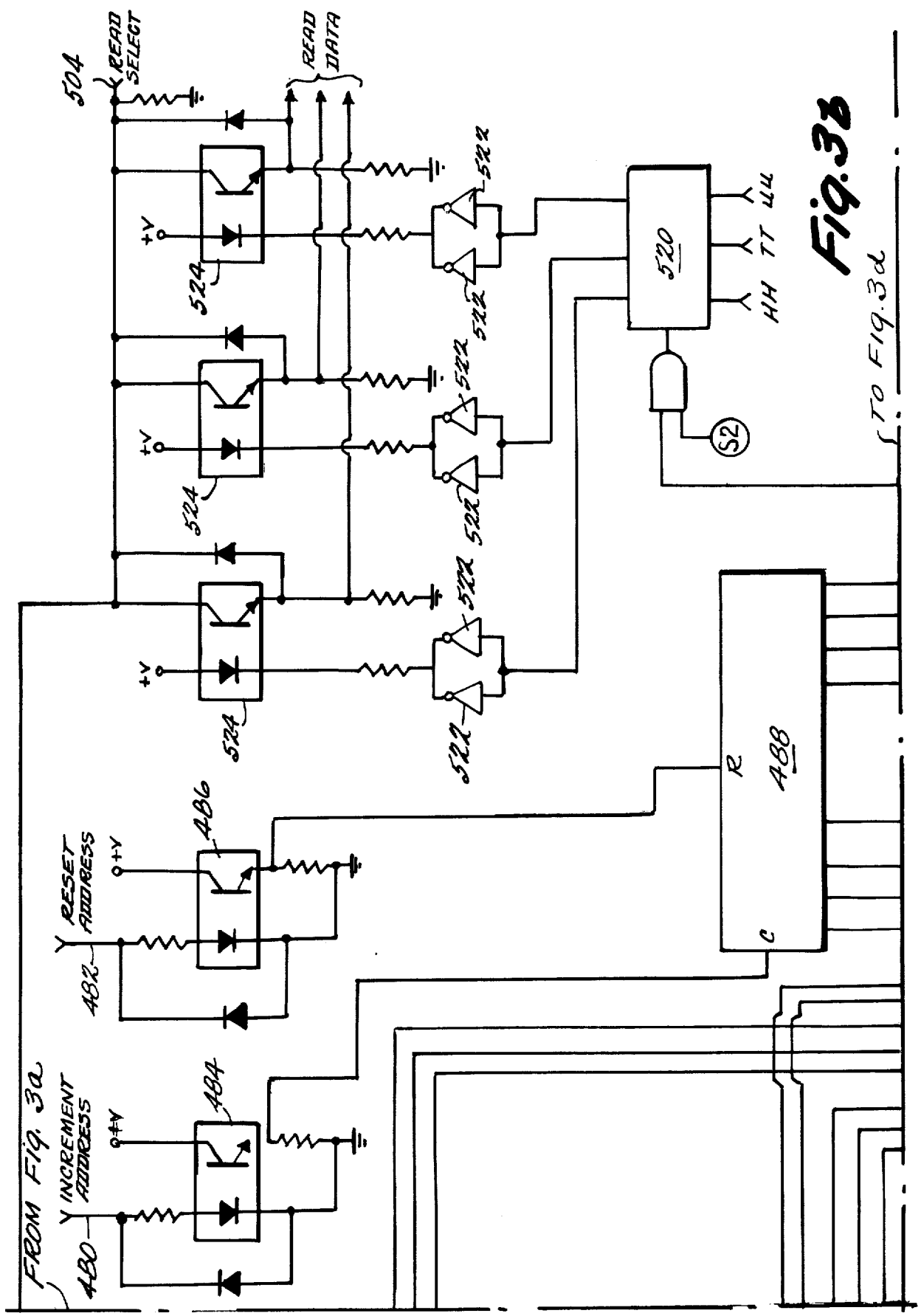

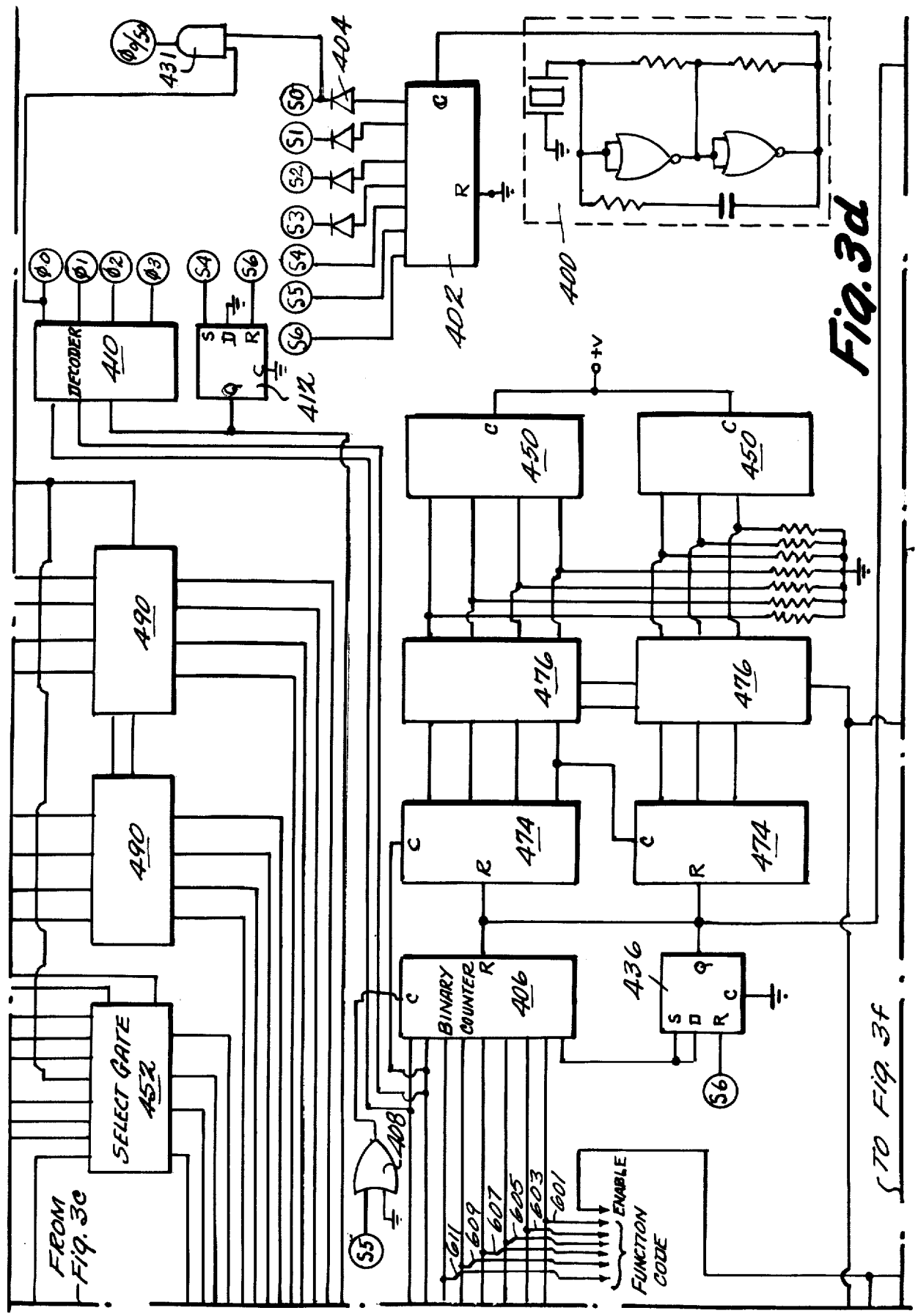

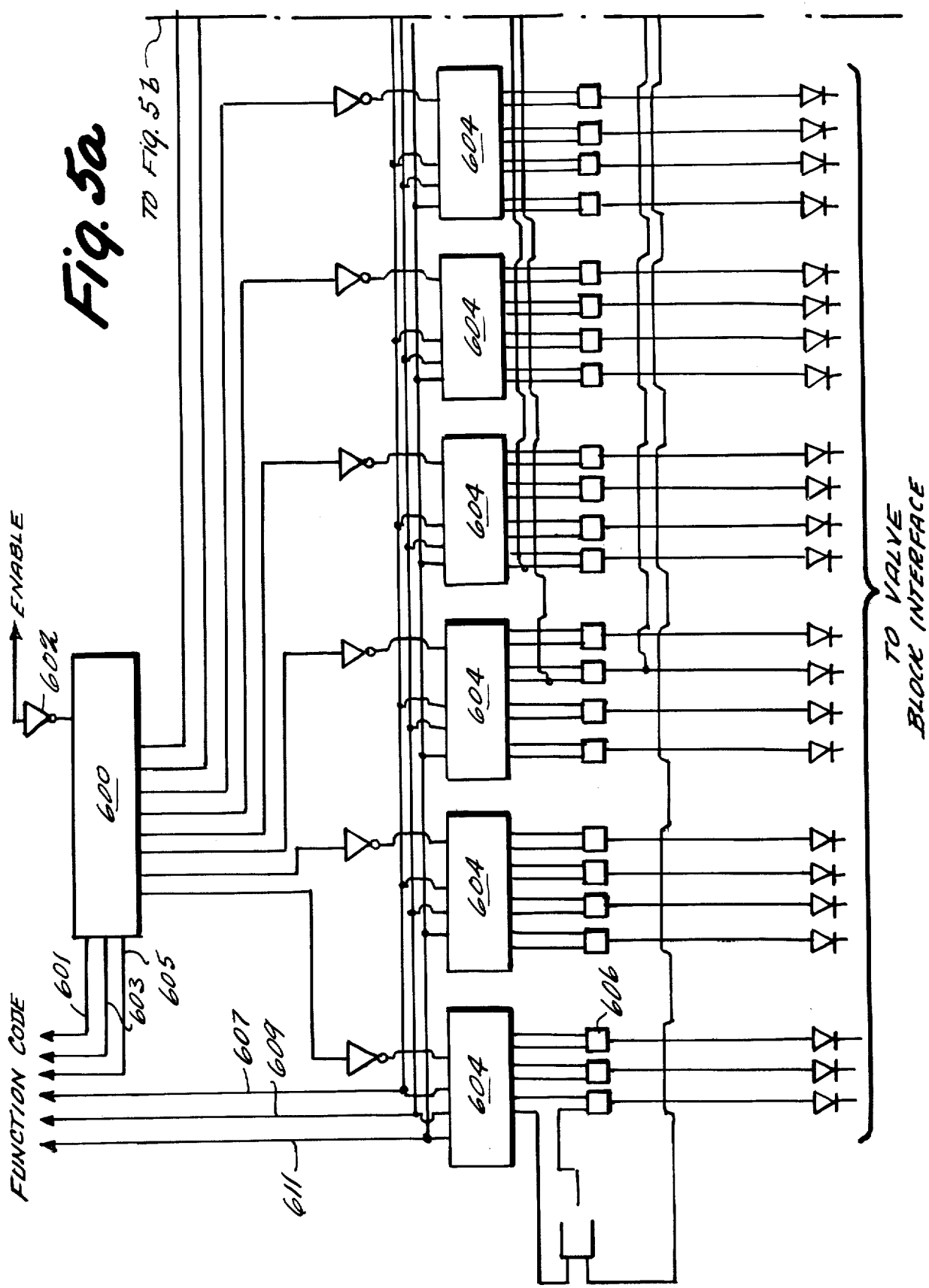

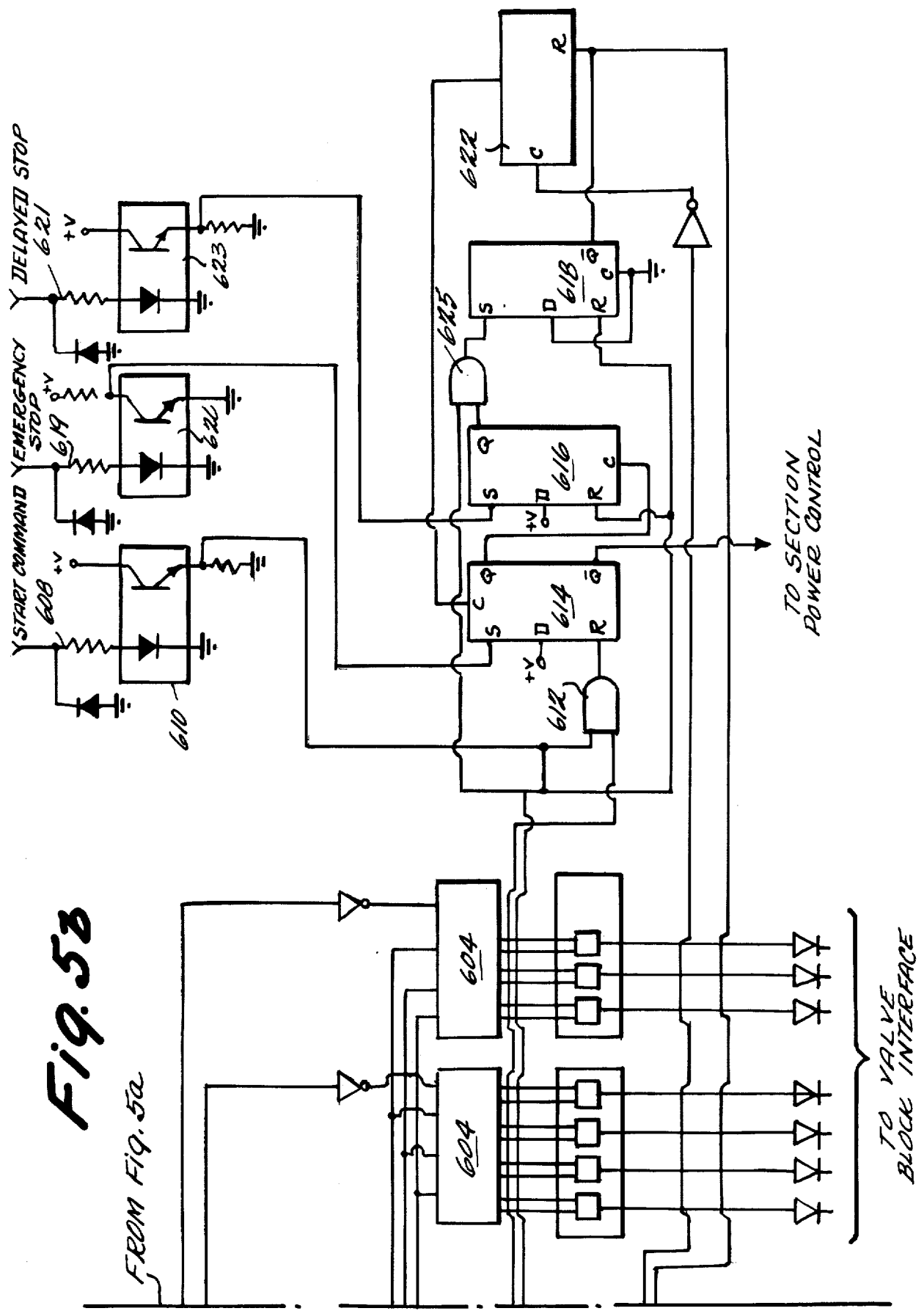

PROGRAMMABLE AUTOMATIC CONTROLLER

This is a continuation of application Ser. No. 06/063,716 filed Aug. 6, 1979, abandoned which is a continuation of Ser. No. 898,211, filed Apr. 20, 1978, abandoned.

BACKGROUND OF INVENTION

This invention relates to a programmable automatic controller for operating a glassware forming machine having a plurality of functional sections which operate in a timed relationship with one another.

In the past, there has been a great need for a programmable controller for operating such complex machines. The glass forming machine is typically comprised of a plurality of individual sections which are integrated into a single plural section machine fed by a single source of molten glass. The sections are operated in synchronism in such relative phase relationship as to permit the several sections to acquire gobs in ordered sequence from a single gob feeding means. Thus, as one of the sections is taking a gob from the feeding means, another section is delivering a finished article to an output conveyor and the other intermediate sections are engaged in various forming steps intermediate the taking of a gob and the production of a finished ware.

Further, it has been customary in the past to provide two molds in each section of an individual section machine whereby a gob is received in a first mold called the blank or parison mold for the initial process of forming a parison, followed by a transfer of the parison to a second mold called the blow mold for a final blowing of the article. By this means, each section of the machine is operating simultaneously upon two workpieces. In order to control the operation of the various functional components of each section of a glass forming machine, a means must be provided for actuating each of the section elements in a preselected cyclic time format so that the operation of one element does not interfere with, but rather complements, the operation of the other components in the section. In addition, means must be provided for interrelating the timing of the individual sections with respect to a machine standard.

The several functional elements of the glass forming stations of the individual section machine are typically controlled by pneumatic pressure which is controlled by either a mechanical synchronizing means in the form of rotary drums or by an electronic timing circuit. An example of the prior art controller utilizing mechanical synchronizing means is disclosed in Ingle, U.S. Pat. No. 1,911,119. The Ingle glass forming machine is cumbersome and more importantly, is difficult to adjust so that the timing of the operation of the various components of the machine can be varied. An example of the prior art controller utilizing electronic timing circuits is U.S. Pat. No. 3,762,907 issued to Richard M. Quinn et al and U.S. Pat. No. 3,969,703 issued to Kwiatkowski et al, both of which are assigned to the common assignee herewith. Some prior art controllers do not include an easy, simplified means for adjusting the time of operation of the various elements in a machine cycle while the machine is operating and accordingly lacks the flexibility desired in an automatic controller.

In addition, the prior art controllers either provided no means or mechanical switch means for adjusting the time relationship of a section with respect to the machine time. Generally, the section delay means comprised components separate and distinct from the components comprising the means for adjusting the function actuation times. If remote controls were desired for varying either the function actuation times or the section delay time, further separate and distinct components were required for processing the remote commands. Thus, the number of components of the prior art controllers was greatly increased as a result of parallel systems of components performing relatively similar tasks.

A further drawback of the prior art is that the components of the prior art controllers are so numerous and of such size and of such sensitivity that it was not practical to locate the controller adjacent to the glassware forming machine being controlled. Glassware forming machines produce large quantities of heat which tend to disrupt the operation of the components in some of the prior art controllers. Therefore, it was necessary to remotely position the controllers, thus requiring an extremely large quantity of cable, means for shielding the cable from the electrical noise of the environment and means for isolating the controller from the cables. This involved a great deal of expense.

It is therefore an object of this invention to provide a flexible programmable automatic controller for operating a glassware forming machine.

It is another object of this invention to provide an automatic controller having a simplified and efficient means for adjusting the time of the operational functions of a glassware forming machine with a high degree of accuracy while the machine is running.

It is yet another object of this invention to provide an automatic programmable controller that can be placed adjacent to the glassware forming machine it is controlling.

A further object of this invention is to provide an automatic programmable controller having means for adjusting the timing of a section with respect to the machine time.

A still further object of this invention is to provide an automatic programmable controller with means for remotely controlling the means for adjusting the timing of a section with respect to the machine time.

Another objective of this invention is to provide a single means for controlling the remote and local variation of section timing and function actuation in order to minimize the number of components comprising the controller.

SHORT STATEMENT OF THE INVENTION

Accordingly, this invention relates to a programmable automatic controller for operating glassware forming sections each having a plurality of functional components which operate in a timed relationship with respect to one another. More specifically, the automatic controller includes a pulse generator which generates machine cycle clock pulses in synchronism with the operation of a machine being controlled wherein the cycle clock pulses provide an instantaneous indication of the time elapsed in each cycle of operation of the machine. A storage device in the form of a random-access memory (RAM) stores the relative times in the machine cycle at which each of the plurality of components of the machine is to be actuated. The address of the stored time is indicative of the function to which the time relates. A comparator compares the output of a first counter which totals the time elapsed in the cycle, with the values stored in the RAM. When a comparison is made, an actuating signal is generated, indicating that the functioning of a machine component is to be either started or stopped, and apparatus responsive to the address of the matched time selects the particular component to be actuated, and provides a component operating command to either start or stop the appropriate component.

It is often desirable, in controlling the operation of a glassware forming machine, to vary the time at which a particular machine element is to be actuated. Accordingly, thumbwheel switches are provided which can be appropriately set during a machine operation to enter a new component actuating time into the RAM. In addition to apparatus for controlling the time in a cycle during which the various components are actuated, apparatus is provided for stopping or starting a section at any time during a machine cycle. Function actuation time variation and section starting and stopping can also be controlled from a location remote from the controller.

The invention also includes a means for controlling the timed relationship of the various machine sections wherein each of the sections operates in a predetermined, interdependent timed relationship with respect to one another. One location in the RAM stores the time by which a section is delayed from the machine cycle time. A second counter also totals the machine cycle time. When the output of the second counter matches the stored section delay time, the first counter is reset, so that, in effect, the first counter totals section cycle time.

Thus, for example, six machine sections may each receive input material from a single source. Accordingly, the controller of the present invention includes means for sequentially coupling the input material to each of the sections in a preselected order and to stagger the section cycles of each of the sections in accordance with the order in which the input material is fed thereto.

As a result of the unified control system, the present invention is comprised of significantly fewer components than prior art electronic controllers, enabling the controller to be positioned adjacent to the machine being controlled. Thus, the costs of installation and operation are greatly reduced.

BRIEF DESCRIPTION OF THE DRAWINGS

Other objects, features and advantages of the present invention will become more fully apparent from the following detailed description, the appended claims and the accompanying drawings, in which:

FIG. 2 is a functional block diagram of the section memory unit and operator control sections of the programmable automatic controller for an individual section;

FIGS. 3a, 3b, 3c, 3d, 3e and 3f are detailed circuit diagrams of the section memory unit together with the controls therefor;

FIGS. 5a and 5b are detailed circuit diagrams of the function enable and start-stop circuitry.

DETAILED DESCRIPTION OF THE PREFERRED EMBODIMENT

Figure 1:
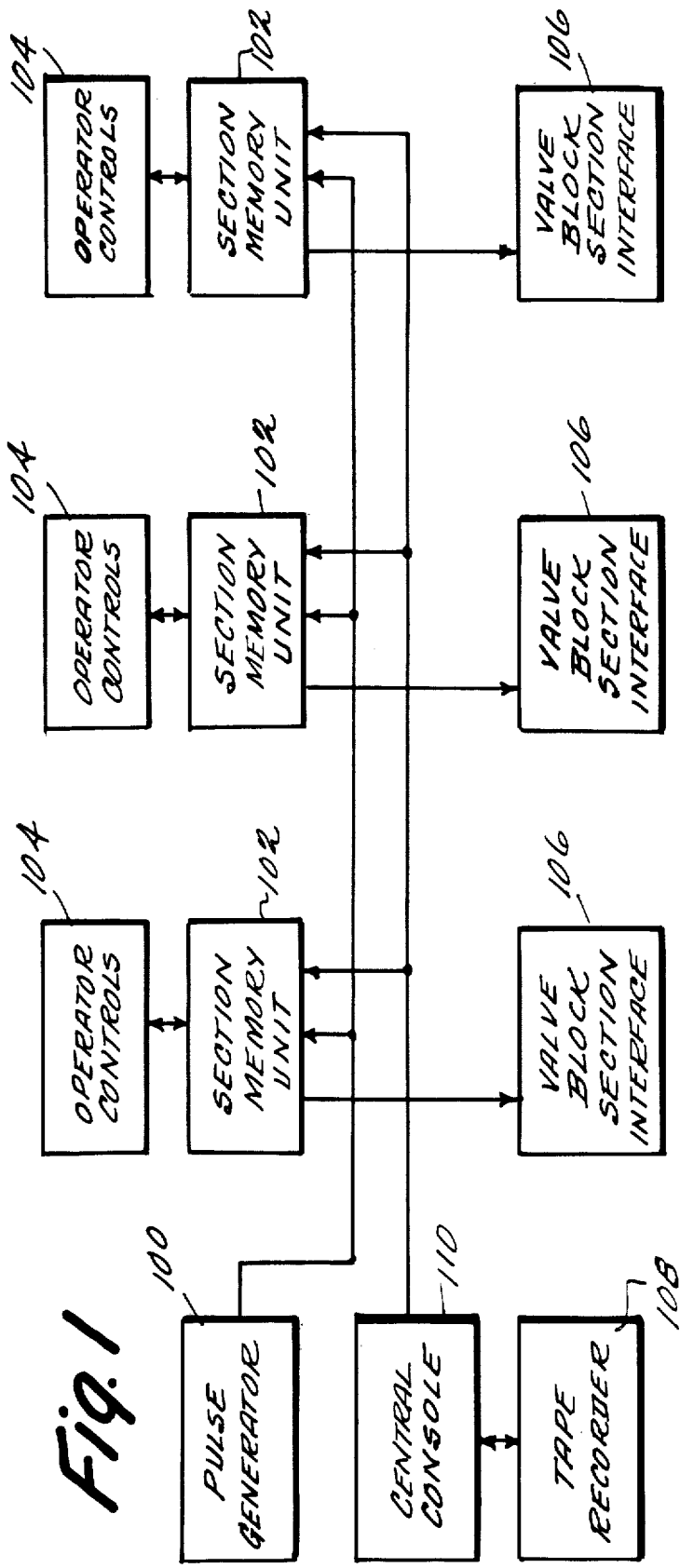
FIG. 1 is a block diagram of the programmable automatic controller system of the present invention.
Figure 4:
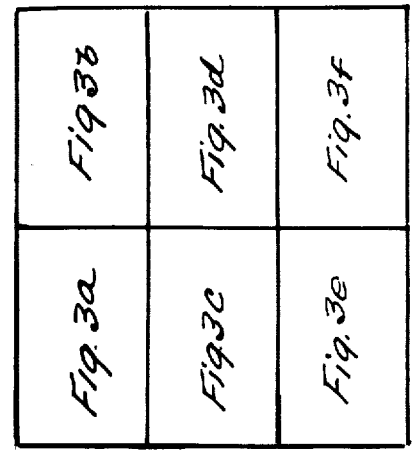
FIG. 4 is a schematic diagram illustrating the manner in which FIGS. 3a, 3b, 3c, 3d, 3e and 3f should be oriented.

Refer now to FIG. 1 where a block diagram of the programmable automatic controller system of the present invention is shown. A pulse generator 100 provides a train of cycle clock pulses and a reset pulse at the completion of the machine cycle. The generator operates on a machine cycle base wherein 360 clock pulse intervals are provided per cycle. In the preferred embodiment, the pulse generator includes a suitable conventional pulse generating means mounted on the drive shaft of the glassware forming machine and generates two pulse trains. The first pulse train provides a cycle clock pulse for every degree of machine rotation and the second pulse train provides one pulse per machine revolution. Thus, assuming that the machine to be controlled operates through a predetermined cycle, one pulse is generated at the beginning of the machine cycle and another pulse is generated every 1/360th of a machine cycle.

The output of pulse generator 100 is coupled to each of a plurality of individual machine section memory units 102. Each section memory unit includes storage, comparing and addressing circuits which, when arranged, as described hereinbelow, determine which elements of the section being controlled are to be actuated at any given time. In addition, each section memory unit includes means for processing the output of thumbwheel switches for changing the relative time in a machine cycle when selected section components are to be actuated.

Operator controls 104 includes start-stop push-buttons for starting up or shutting down the machine being controlled.

In addition, operator controls 104 include a degree display for instantaneously displaying the cycle time elapsed for a particular section being operated. Finally, the operator controls include thumbwheel switches for controlling the changing of the relative actuation times, and a function select control for designating which operational element is having its timing changed by the thumbwheel switches. The design of the controller is such that it may be positioned near the machine being controlled so that the operation of the machine can be monitored while the various control functions in the operator controls are being changed.

The output of each of the section memory units 102 is coupled to an associated valve block machine interface 106 which provides the mechanical drive means for the machine being controlled. If, for example, the glassware forming machine being controlled is operated on a pneumatic basis, the valve block interface might include a number of valves which are controlled by solenoid actuators, the solenoid actuators being in turn controlled by the output of section memory units 102. A detailed description of the valve block machine interface will not be presented herein, because actuators in valves for operating machine elements are known in the art and because of the applicability of the control system of the present invention to different glassware forming machines each having a different valve block machine interface structure.

A tape recorder 108 is provided, which stores operational commands generated by a decimal keyboard. Thus, if the sections being controlled are to be operated in a number of different modes, each particular program mode may be stored on tape until it is utilized. The output of the tape is coupled to a central console 110 which provides dual operator controls so that the variables of all sections under the control of central console 110 may be altered from a central location. The central console controls override the individual operator controls 104. In addition, as each of the individual sections are operated under the control of their associated section memory units 102, the section memory unit may provide an output to the central control verifying the order in which the respective components of the machine are actuated. This information may be stored in the tape recorder for future use.

Refer now to FIG. 2 with respect to which a more detailed description will be given of the section memory unit 102 and the operator controls 104. The reset output of clock 100 resets section synchronization controller 200. Cycle clock pulses then increment a counter within section synchronization controller 200. One of the addresses in RAM 202 stores the time relationship of the particular section to the machine generally. For example, if a particular section is to be delayed 60 degrees behind the machine cycle, one address of RAM 202 would contain the equivalent of 60. When this particular address is accessed by RAM address select 204, this time is compared in section synchronization controller 200 with the machine cycle time as stored in a counter. When a favorable match occurs, section synchronization controller 200 resets counter 206.

Pulse generator 100 also clocks counter 206, so that the stored count is indicative of the section cycle time. For every clock pulse from pulse generator 100, RAM address select 204 accesses every memory location in RAM 202 storing an actuation time. The accessed times are compared with the output of counter 206 in function time comparator 208. If a favorable match is found, the comparator produces an enable signal to which function enable circuit 210 is responsive. The enable signal permits the address of the matching time to be translated into a signal to which valve block machine interface 106 is responsive to activate or deactivate a section function.

The actuation time of any machine section component may be altered quite easily. The particular function to be altered is selected by use of a rotary switch and the new actuation time is entered on thumbwheel switches. Upon depression of an enter button, the selected function is compared with the function currently being addressed by the RAM address select 204. When a favorable comparison occurs, data enter control 212 permits data on the thumbwheel switches to be entered into the addressed RAM 202 location. Data may also be entered from central console 110. An override command from central console 110 to data enter control 212 permits the entry of data from the central console as opposed to the thumbwheel switches located on the controller adjacent to the section being controlled. In addition, the actuation time of the function currently selected by the function select rotary switch is displayed on actuation time display 214.

Function enable circuit 210 is also responsive to start-stop controls 216. Upon depression of the start switch, function enable circuit 210 prohibits an output to valve block machine interface 106 until the function that should properly be actuated first is enabled. Provision is also made for an emergency stop and a delayed stop. The emergency stop immediately prohibits further movement of the glassware making section after opening the two molds therein. The delayed stop prohibits any further molten glass from being fed into the machine section; but permits the section to run through three machine cycles before the section comes to rest in order to clear the section of all glass.

As an alternative to the operation as described above, the function times could be stored in RAMS 202 consecutively. If a match is found by comparator 208, RAM address select 204 would immediately increment the address, and the contents of the new address would be compared by comparator 208. If the new contents also match, RAM address select 204 would again increment the address accessed and the contents of the new address would be compared. This process would continue until no match exists. The functions corresponding to the matched times would all be activated essentially simultaneously. RAM address select 204 would hold at the first address having contents that do not match until the output of counter 206 does match the contents of the addressed location.

Referring now to FIGS. 3a through 3f, internal clock 400 (FIG. 3d) can be any conventional oscillator with an output frequency of approximately 500 kilohertz. Decade counter 402, responsive to clock 400, has ten output terminals which are normally low, with each of the outputs consecutively going high with each clock pulse for one clock pulse, so that the output signals of counter 402 are a series of phase-shifted pulses each with a frequency of 1/10 of the output of clock 400 and a pulse width of the width of the output of pulses of clock 400. Seven outputs of counter 402 are used and are represented as S0 through S6. The S0 through S3 signals are inverted by inverters such as inverter 404.

Thus, the output of counter 402 are signals having the same frequency but phase-shifted to provide timing pulses for the various components of the circuit. Counter 402 can be any counter having a similar output, but is preferably the MC14017B chip manufactured by Motorola.

Binary counter 406 is responsive to the S5 signal through NOR gate 408. Counter 406 may be any binary counter having at least nine bits, but in the preferred embodiment, counter 406 is an MC14040B chip manufactured by Motorola.

The two lowest order outputs provide the two lowest order inputs for BCD to decimal decoder 410. The binary number represented on the input lines causes one of the ten output lines to go high during the period of that count. The highest order input is grounded, and the next highest order input acts as an inhibit as described below. The two lowest order inputs are capable of counting from zero to three, which cause the output lines represented by ∅0 through ∅3 to consecutively go high. In the preferred embodiment decoder 410 is the MC14028B chip manufactured by Motorola.

Thus, the timing relationship is such that as each ∅0 signal is high, the S0 through S6 signals each go high once. Flip-flop 412 causes the third order input to go high during the period between the beginning of the S4 pulse and the beginning of the S6 pulse in each cycle of S0 through S6. During that period, 0 through ∅3 remain low. All of the flip-flops in this circuit may be any flip-flop capable of functioning as described. However, in the preferred embodiment all of the flip-flops are the MC14013B chip manufactured by Motorola.

The machine reset signal from pulse generator 100, as it enters the controller, passes through optical isolator 414 (FIG. 3e) and buffer 416 to clock flip-flop 418. This in turn causes the data input of flip-flop 420 to go high.

The next time the S1 signal is high while the ∅0 signal is high, flip-flop 420 is clocked by the output of AND gate 421 causing degree counters 422 (FIG. 3f) to be reset and flip-flop 418 to be reset. As the machine clock signal enters the controller, it passes through optical isolator 424 and buffer 426 causing the data input of flip-flop 428 to go high. The next time the ∅0/S0 signal produced by AND gate 431 (FIG. 3d) goes high, the clock pulse is advanced to the output of flip-flop 428, which in turn clocks degree counters 422. The falling edge of the $\overline{Q}$ output of flip-flop 428 causes flip-flop 420 to be reset. The frequency of the ∅0/S0 signal is such that every clock pulse entering the controller will be advanced to the output of flip-flop 428 to clock degree counters 422. The output of counters 422 represents the time that has passed in each machine cycle as determined by the reset signal followed by the clock pulses.

Figure 3C:
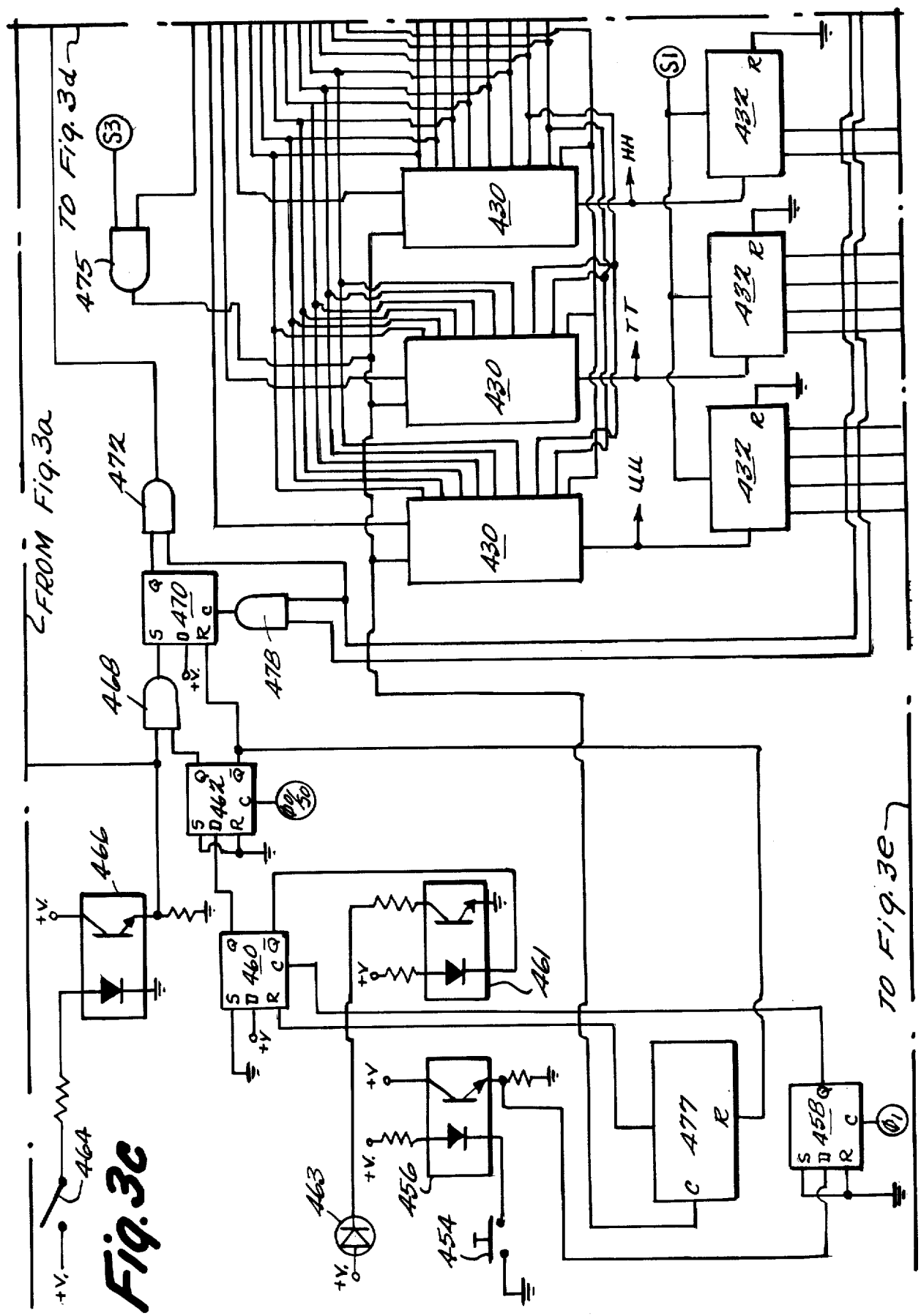

RAM address counter 406 (FIG. 3d), in addition to creating the ∅0 through ∅3 output signals, also addresses RAMS 430 (FIG. 3c). In the preferred embodiment the RAMS are the CD4061 ADRAMS manufactured by RCA. Any other suitable RAMS may be employed. The time of each function is stored in 12 bits located at the same four incremental addresses of each of the three RAMS. After an address has been incremented by RAM address counter 406, the contents of the newly addressed location of RAMS 430 are clocked into serial to parallel shift registers 432. The shift registers can be any four bit output serial to parallel shift register, but in the preferred embodiment they are the MC14015B chip manufactured by Motorola.

The time stored in the highest address location of RAMS 430 represents the time by which the particular section is delayed behind the machine cycle as determined by the reset and clock signals. After this highest time has been clocked into shift registers 432, flip-flop 436 (FIG. 3d) sets, causing BCD latches 434 (FIG. 3f) to enter this time. When S1 is high at the same time ∅0 is high, comparators 438 compare the output of latches 434 with the output of counters 422. If a favorable match occurs, the output of comparators 438 reset counters 440 (FIG. 3e) which represents the time elapsed in the particular section cycle.

Figure 3E:
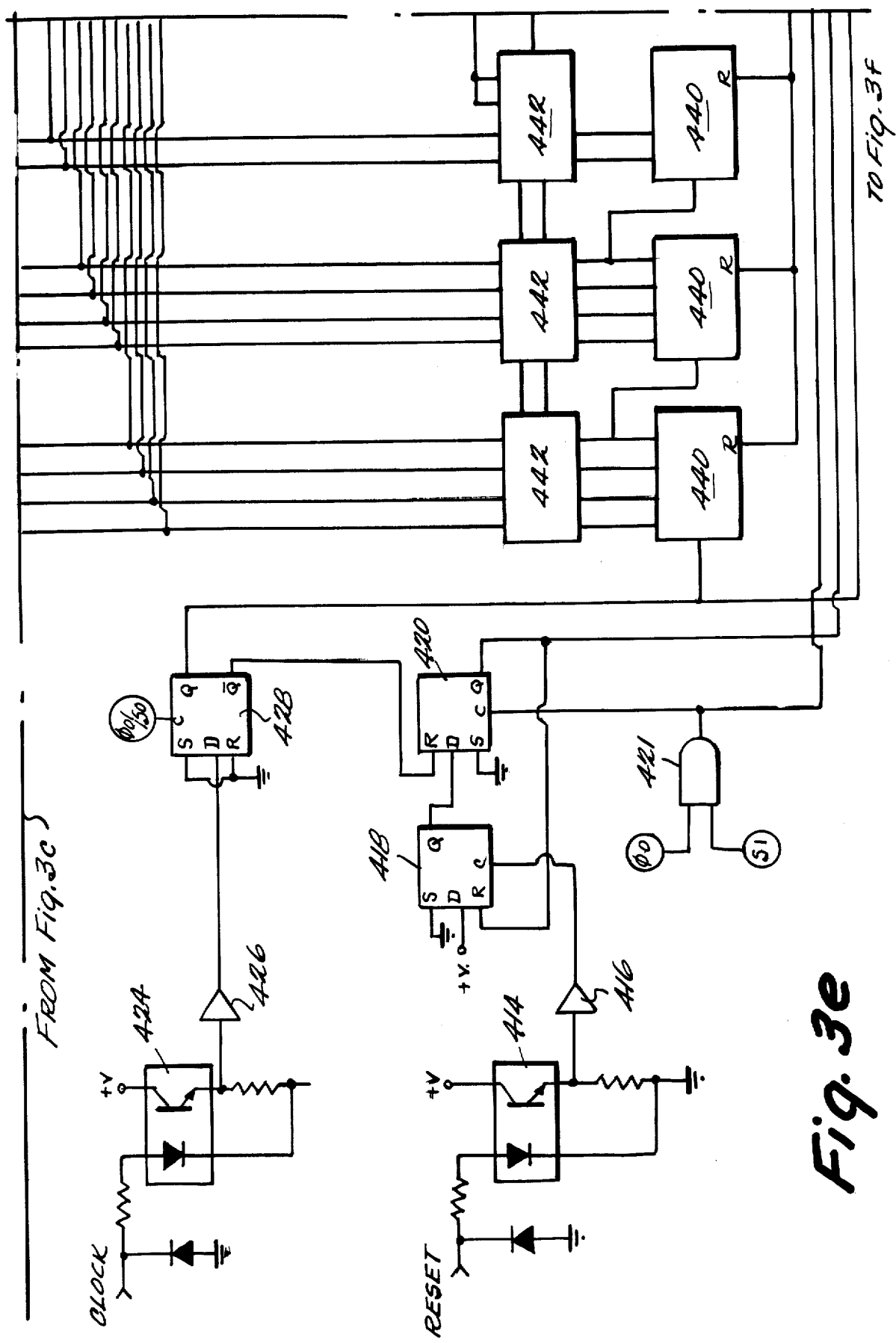
Figure 3F:
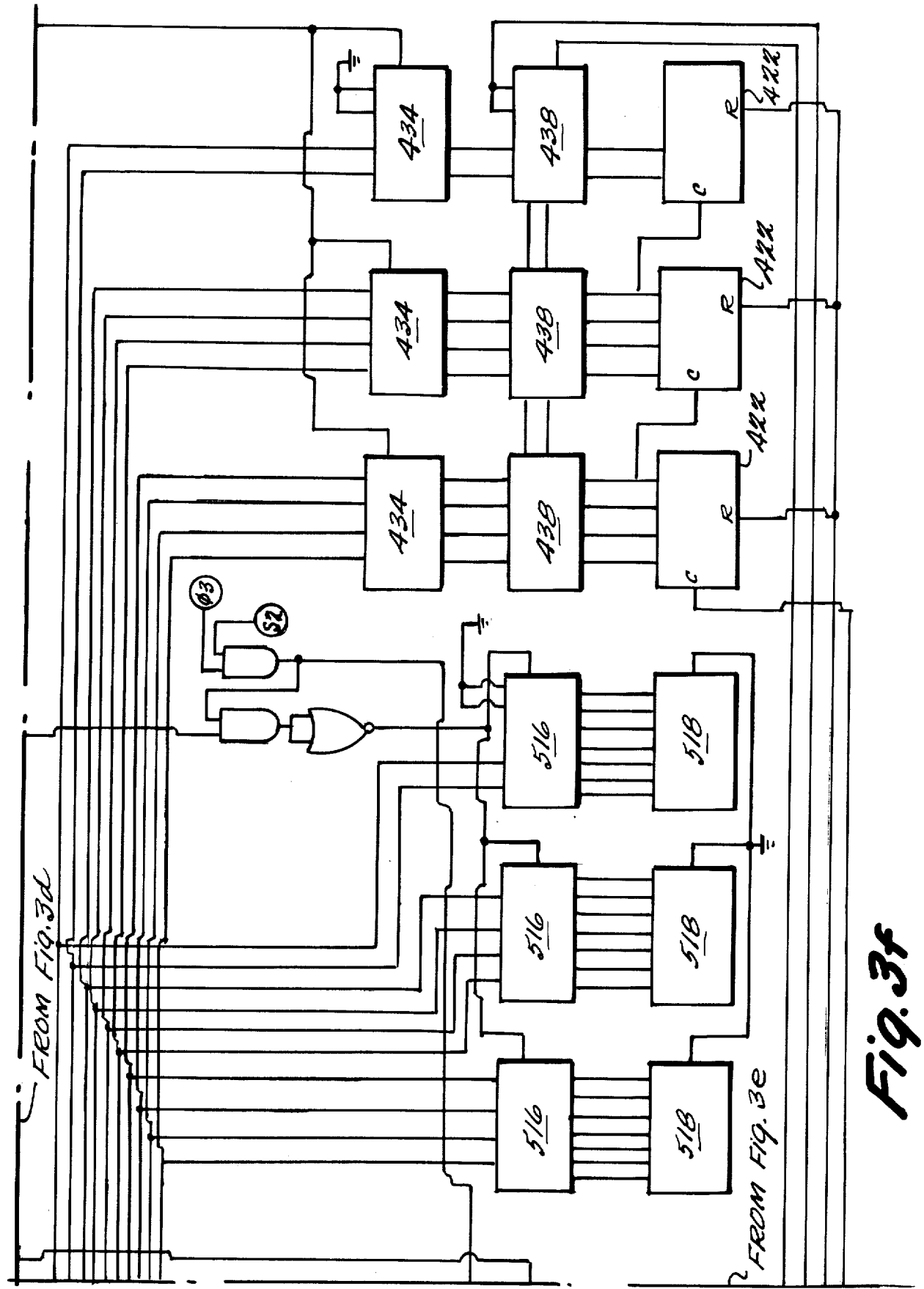

As mentioned above, each address of RAMS 430 is addressed during each clock pulse. The data on the output lines of shift registers 432 (FIG. 3c) represent a coherent time every fourth data access. On every fourth data access, the output of shift registers 432 is compared with the output of counters 440 in comparators 422 (FIG. 3e). All comparators used in the circuit can be any four bit comparators capable of performing the described functions; however, in the preferred embodiment the MC14585 comparator manufactured by Motorola is used. A favorable comparison by comparators 442 indicates that the function whose time has been compared to the output of counters 440 should be enabled. The address favorably compared and the output of comparators 422 is supplied to the component enable circuit of FIG. 5.

As mentioned above, the alteration of an actuation time for a particular function is easily accomplished. First, one selects the function whose actuation time is to be changed on function select switches 450 (FIG. 3d). Then the actuation time to which a change is desired is set on thumbwheel switches 446 (FIG. 3a) which produce a BCD output which is the input for parallel to serial shift registers 448. Shift registers 448 can be any parallel to serial shift registers having at least four input bits; however, the MC14021 chip produced by Motorola is used in the preferred embodiment. The ∅0/S0 signal from AND gate 431 presets the shift registers 448 to the number selected by the thumbwheel switches 446, and the S1 signal advances that data through the shift register. At the appropriate time, as controlled by select gate 452 (FIG. 3d) and circuitry described below, the output of each shift register respectively is fed into one of RAMS 430, with the output of each shifts being stored in an incremental location. Select gate 452 can be any select gate that is capable of switching either one of two sets of three inputs to an output, but in the preferred embodiment is the CD4019 select gate manufactured by RCA.

To enter data, the enter switch 454 (FIG. 3c) is depressed, causing optical isolator 456 to present a high signal to the data input of flip-flop 458. On the next ∅1 pulse, flip-flop 458 is clocked causing enter pushbutton flip-flop 460 to be clocked so as to put a high voltage on the data input of flip-flop 462.

The clocking of enter pushbutton flip-flop 460 causes its $\overline{Q}$ output to become low, so that the diode of optical isolator 461 conducts. The resultant current flow through the photo-transistor of isolator 461 causes Data Enter light emitting diode 463 to light.

Data may be entered into the RAMS 430 either when the section is running or when the section is stopped. If the section is stopped, switch 464 is closed, causing the output of optical isolator 466 to go high, which in turn causes one input of AND gate 468 to be high. Since the output of flip-flop 462 is also high, flip-flop 470 becomes set, which causes the one input of AND gate 472 to become high.

As RAM address counter 406 (FIG. 3d) causes each location of RAMS 430 to be accessed, the divide by four line of the output of counter 406 clocks BCD counters 474. The divide by four line of counter 406 is taken so that one pulse at the clock input of counters 474 represents the incrementation to the next function time stored within RAMS 430. The output of counters 474 is compared with the output of function select switches 450 in comparators 476. A favorable match in comparators 476 indicates that the function selected on function select switch 450 matches the function whose time has just been accessed from RAMS 430. This causes the second input, and therefore the output, of AND gate 475 to become high so that one input of AND gate 475 becomes high. At the appropriate time, i.e., the next S3 pulse, the output of AND gate 475 becomes high, enabling the write inputs of RAMS 430. This enable signal also clocks decade counter 477 (FIG. 3c) which counts from zero to four, representing one complete actuation time transfer. The signal representing the count of four resets flip-flop 460. In the preferred embodiment counter 477 is the MC14017B decade counter manufactured by Motorola.

If the section is running, switch 464 is open causing the set input of flip-flop 470 to be low. However, when a favorable match is found by comparators 476, and the same function has been enabled by comparators 422, the output of AND gate 478 becomes high clocking flip-flop 470. Thus, the output of AND gate 472 becomes high, which enables data to be transferred into RAMS 430, upon the next S3 signal.

Thus, if the machine is not running, data is entered momentarily after the depression of enter switch 454 upon the next accessing of the locations of RAMS 430 that represent the function whose time is to be changed.

If the section is running, new data cannot be entered into RAMS 430 until the function whose actuation time is to be changed has been actuated after enter switch 454 has been depressed.

Data may also be entered remotely from central console 110 via a data link. The central console controls include means for resetting to zero the address of the function time to be altered and means for incrementing that address. The signals representing the reset and increment command respectively come in on data link lines 482 and 480 (FIG. 3b) and pass through the respective optical isolators 484 and 486. These signals respectively reset and clock data link address counter 488. Counter 488 may be any binary counter with at least eight output bits, but in the preferred embodiment is the MC14040B counter manufactured by Motorola. When the output of data link address counter 488 matches the output of counter 406, (FIG. 3d) the address to be modified is being accessed. The output of comparators 490 enables select gates 452. To write into the RAMS 430 from the remote console 110, both the data link read select line 504 (FIG. 3b) and the data link write select line 506 (FIG. 3a) must be high. This causes optical isolators 510 and 512 (FIG. 3a) to conduct, so that the data input of flip-flop 508 to go high. Upon the next clock pulse to flip-flop 508, when the machine is not running during an S1 signal as determined by AND gate 514, the Q output of flip-flop 508 becomes high, causing select gate 452 to accept data from remote inputs and not from thumbwheel switches 446. Upon a favorable comparison in comparators 490 (FIG. 3d), select gate 452 is enabled causing data link lines 492, 494, and 496 (FIG. 3a), respectively representing the units, tens and hundreds data from central console 110 to pass through, respectively, optical isolators 498, 500 and 502, and select gate 452 to RAMS 430.

The time at which any component is set to actuate can be displayed either at the controller or at central console 110. To display the timing of a function at the controller, the appropriate function is selected on function select switches 450 (FIG. 3d). When comparators 476 find a match, value latch driver/decoders 516 (FIG. 3f) latch the output of serial to parallel shift registers 432 (FIG. 3c) which represents the time of the function matching the function selected by the function select switches 450. The output of latches 516 drive displays 518. Latches 516 can be any suitable latches, but in the preferred embodiment are the MC14543 Decoder/-Drivers manufactured by Motorola. Displays 518 are, correspondingly, seven segment light emitting diode displays.

To access the contents of a particular location in RAMS 430 from central console 110, the address is selected as indicated above, with lines 480 and 482 controlling counter 488 (FIG. 3b). When comparators 490 indicate a match, the output of RAMS 430 is latched in data out latch 520 (FIG. 3b), which may be any three bit latch, but it is preferably the MC14042 Quad Latch manufactured by Motorola. The output of data out latch 520 is inverted by inverters 522 and connected to the light emitting diode of optical isolators 524. Upon the occurrence of a read select signal on data link line 504, a high voltage is supplied to the photo transistors of optical isolators 524 causing the read data lines to supply the output data.

Referring now to the component enable circuitry of FIGS. 5a and 5b, the enable line from comparators 442 enables decoder 600 (FIG. 5a) after passing through inverter 602. Decoder 600 may be any BCD to decimal decoder, but in the preferred embodiment the MC14028B decoder manufactured by Motorola is used. Address lines (indicating the function to be activated) 601, 603 and 605 also are inputs to decoder 600, the outputs of which act as chip enable lines for decoders 604 which can be any decoders, but are preferably the same decoders as decoder 600. Thus, input lines 601, 603, and 605 act as chip enable lines for decoders 604 while input lines 607, 609, and 611 are supplied to each decoder 604, so that for any given combination of input lines, one output of decoders 604 becomes high. The decoders 604 are attached to flip-flops such as flip-flop 606, the two decoder lines to each flip-flop being connected to the set and reset inputs. The output of each flip-flop 606 goes to valve block interface 106 to enable a particular function. One input line to each flip-flop 606 enables the function, while the other input line to each flip-flop stops the function.

When the controller is initially powered, the electrical components of the controller begin functioning. Signals to valve block machine interface 106 are outputted by flip-flops 606. However, the machine does not initially respond to the command signals. To begin the operation of any given section, the start button on either the controller or central console 110 must be depressed, causing line 608 to become high, which in turn passes through optical isolator 610 to one input of AND gate 612. In order for the section to start in an orderly manner, section operation should commence with one particular function, e.g., in the case of the preferred embodiment, with the movement of the arm that transfers the parison from the blank mode to the blow mode back to the blank mode. Upon the occurrence of the revert arm pulse out of decoders 604, flip-flop 614 is reset which causes the $\overline{Q}$ output to become high, which in turn causes the section to respond to the command signals produced by flip-flops 606. The pressing of the start button also causes flip-flops 616 and 618 to be reset.

The preferred embodiment of the present invention includes two different stopping modes. Upon depression of the emergency stop switch, a high signal on emergency stop line 619 is transferred through optical isolator 620 which sets flip-flop 614. This causes the section power to turn off as soon as the parison and blow molds open. Upon depression of the delayed stop switch, a high signal passes on delayed stop line 621 through optical isolator 623 to set flip-flop 616. This causes one input terminal of AND gate 625 to become high. In order to assure an orderly stop, a certain function should be performed last. In the case of the preferred embodiment, this should be the inversion of the parison between the blank mold and the blow mold. Upon the next occurrence of this function, the output of AND gate 625 sets flip-flop 618, which in turn removes the reset from counter 622 which may be any counter having one output line that becomes high on the third clock pulse after reset, but in the preferred embodiment is the MC14017B decade counter manufactured by Motorola. As soon as the delayed stop button is pressed, no further molten glass is fed into the section. Counter 622 then counts each invert operation. By the third activation of the invert function, no glass remains in the machine. At this point, the output of counter 622 indicating the third clock pulse becomes high, clocking flip-flop 614, so that the $\overline{Q}$ output of flip-flop 614 becomes low, turning off the power to the section.

All of the integrated circuits described above are preferably composed of complementary metal oxide semiconductors (CMOS), thereby greatly reducing the heat that must be dissipated from each of the integrated circuits. This enables the integrated circuits to be much more compactly positioned on a circuit board and the circuit board to be mounted in a smaller container.

The timing relationships of the various elements of the controller are very important to the successful operation of the circuit. This timing, as indicated above, is controlled by the signals ∅0 through ∅3 and S0 through S6. For every machine clock pulse, the ∅0 through ∅3 signals each become high at least once. During each of the ∅ pulses, each of the S0 through S6 signals become high exactly once. The period from the beginning of a ∅0 pulse through the end of a ∅3 pulse represents one controller cycle, or 1/360 of a section, cycle, with the S signals further dividing each ∅ pulse.

During the ∅0/S0 unit of time, the output of the enter pushbutton flip-flop 460 (FIG. 3c) is clocked to the output of flip-flop 462. The machine clock pulse is advanced through flip-flop 428 (FIG. 3e) to counters 422 and 440. Also, parallel to serial shift registers 448 are strobed, so that the data on thumbwheel switches 446 are entered. Finally, flip-flop 508 (FIG. 3a) is reset so that select gate 452 is set to receive information from shift registers 448.

During the ∅0/S1 period, shift registers 448 are clocked so that new information is presented to RAMS 430, and shift registers 432 (FIG. 3c) are clocked so that new data is entered into shift registers 432 from RAMS 430. Also, flip-flop 420 (FIG. 3e) is clocked so that the machine reset signal resets counters 422. Finally, if the section is stopped and if the read and write select data link lines 504 and 506 are high, then flip-flop 508 is clocked, causing select gate 452 (FIG. 3d) to accept data from the central console 110.

When an S2 signal is produced during the ∅0 period, data out latch 520 (FIG. 3b) enters data from the output of RAMS 430 if comparators 490 have found a favorable match between RAM address counter 406 and data link address counter 488.

During the ∅0/S3 period, the new first data bit is written into RAMS 430 and counter 477 (FIG. 3c) is incremented to a count of one if conditions in the last ∅3/S2 period permit. Also, if the data link was selected with a data link write command during the ∅0/S1 period, and RAMS 430 address is the same as data link address counter 488 address, then the data byte from the data link is written into RAMS 430.

During the ∅0/S4, ∅0/S5 and ∅0/S6 periods, decoder 410 (FIG. 3d) and RAMs 430 are inhibited, ∅1 output of decoder 410 is selected, and decoder 410 and the RAMS 430 are enabled respectively.

Next, signals are concurrently produced on the ∅1 and S0 lines. As this occurs, flip-flop 508 (FIG. 3a) is reset so that select gate 452 accept data from shift registers 448. Also, flip-flop 458 (FIG. 3c) is clocked so that the enter pushbutton signal appears at the clock input of enter pushbutton flip-flop 460.

The S1 signal then produces a pulse during the ∅1 pulse, causing the second data byte from shift registers 448 (FIG. 3a) to be shifted to the output line. The next output byte from RAMS 430 is shifted into shift registers 432. Also, if the section is stopped and if the data link write select line 506 is high, then the Q output of flip-flop 508 becomes high causing select gate 452 to permit data on the data link to be applied to the RAMS 430 input line.

During the ∅1/S2 period, latch 520 (FIG. 3b) is strobed, entering data from the output of RAMS 430 if the output of RAM address counter 406 compares favorably with the output of data link address counter 488.

During the ∅1/S3 period, the new second data bit is written into RAMs 430 and counter 477 (FIG. 3c) is advanced to the count of two if the conditions in the last ∅3/S2 period permit. If the data link was connected to RAMS 430 with a write command during the ∅0/S1 period and the output of RAM address counter 406 is the same as the output of the data link address counter 488, then the data on the data link is written into RAMS 430.

During the ∅1/S4, ∅1/S5 and ∅1/S6 periods decoder 410 (FIG. 3d) and RAMs 430 are inhibited, a signal is produced on the ∅2 line, and decoder 410 and RAMS 430 are enabled respectively.

Thus, a signal appears on the ∅2 line. When this corresponds to a signal on the S0 line, flip-flop 508 is reset causing select gate 452 to accept data from thumbwheel switches 446 via shift registers 448.

During the ∅2/S1 period, the third data byte is clocked from shift registers 448 through select gate 452 to the input of RAMS 430. In addition, the next output byte of RAMS 430 is clocked into shift registers 432. If the section is stopped and if the data link write command line 506 is high, then the data link lines 492, 494, and 496 are switched by select gate 452 to the RAM 430 data input lines.

When the ∅2 pulse occurs at the same time as the S2 pulse, latch 520 is strobed with the output of RAMS 430 if the output of RAM address counter 406 compares favorably with the output of data link address counter 488.

During the ∅2/S3 period, the third data byte is written into RAMS 430 and counter 477 is advanced to the count of three if the conditions in the last ∅3/S2 period permit. If the data link was selected with the write command during the last ∅0/S1 period and the output of RAM address counter 406 is the same as the output of data link address counter 488, the data byte from data link lines 492, 494, and 496 are written in RAMS 430.

During the ∅2/S4, ∅2/S5 and ∅2/S6 periods, decoder 410 and RAMS 430 are inhibited, a signal is produced on the ∅3 line, and decoder 410 and RAMS 430 are enabled respectively.

Next, a signal appears on the ∅3 line concurrently with a signal appearing on the S0 line. At this occurrence, flip-flop 508 is reset, causing select gate 452 to accept data from shift registers 448.

When the ∅3 pulse occurs at the same time as the S1 pulse, the fourth data byte is clocked from shift registers 448 through select gate 452 to the input of RAMS 430. In addition, the next output byte of RAMS 430 is clocked into shift registers 432. If the section is stopped and if the data link write select line 506 is high, then the data link lines 492, 494 and 496 are switched by select gate 452 to the RAM 430 data input lines.

During the ∅3/S2 period, shift registers 448 are clocked so that the fourth data byte from each of shift registers 448 is outputted to the respective RAM data line. Also, the fourth data byte from RAMS 430 are entered in shift registers 432. Finally, if the section has stopped, and if the data link write select line 506 is high, then the select gate 452 permits data on the data link lines 492, 494 and 496 to be advanced to the inputs of RAMS 430. During the ∅3/S2 period, if the output of comparators 442 indicate a favorable match, value driver/decoders 516 are enabled. If enter pushbutton 454 is also depressed and comparators 476 indicate a favorable match, (indicating that the function select switch is set to the function currently being accessed), flip-flop 470 is clocked, thus permitting a write operation into RAMs 430 on the following S3 signal. Finally, latch 520 is clocked with the output of RAMS 430 if the output of RAM address counter 406 corresponds to the output of data link address counter 488.

When the ∅3 signal occurs concurrently with the S3 signal, the fourth data byte from shift registers 448 is written into RAMS 430 and counter 477 is incremented to a count of four if conditions in the last ∅3/S2 permit. Note that the count of four on counter 477 causes the reset of enter pushbutton flip-flop 460 so that the data input to flip-flop 462 becomes low. If the data link was selected with a write command from line 506 during the ∅0/S1 period and the output of RAM address counter 406 is the same as the output of the data link address counter 488, then the data from data link lines 492, 494 and 496 is written into RAMS 430.

During the ∅3/S4, ∅3/S5 and ∅3/S6 periods, decoder 410 and RAMS 430 are inhibited, a signal appears on the ∅0 line and decoder 410 and RAMS 430 are enabled respectively.

The components comprising the controller described above are greatly reduced in number in comparison to prior art systems as a result of the elimination of multiple components performing similar functions. In addition, as mentioned above, the employment of complementary metal oxide semiconductor integrated circuits (CMOS) reduces the heat that must be dissipated from each chip. Thus a much more compact controller is possible, resulting in a minimization of cooling requirements.

Although only one exemplary embodiment of this invention has been described in detail above, those skilled in the art will readily appreciate that many modifications are possible in the exemplary embodiment without materially departing from the novel teachings and advantages of this invention. For example, the arrangement of the RAMS storage devices can be rearranged in a number of different methods. Accordingly, all such modifications are intended to be included within the scope of this invention as defined in the following claims.

What is claimed is:

1. A programmable automatic controller for controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said controller comprising:

timing means for generating a digital signal providing an instantaneous indication of the time elapsed in each cycle of operation of said machine;

storage means for storing the relative times in a cycle of machine operation when each of the plurality of components is to be actuated;

an internal clock pulse generating means generating clock pulses independent of said digital signal;

a digital counter incremented by said clock pulse generating means, having an output connected to the address input of said storage means so that each of the locations of said storage means storing an actuating time is accessed each time a machine cycle clock pulse is generated;

switching means capable of being mechanically set by an operator to a desired actuating time for varying the actuating time of selected components stored in said storage means to thereby change the relative times in each machine cycle when said selected components are to be actuated;

function select means, responsive to said digital counter, for selecting the function whose actuating time is to be changed;

gating means for reading the setting on said switching means into said storage means;

comparator means for comparing said digital signal corresponding to the times elapsed in each cycle with at least one relative component actuating time stored in said storage means, said comparator providing an actuating signal when a favorable comparison results;

addressing means, responsive to the output of said digital counter, receiving said actuating signal from said comparator means for providing a component operating command to the component whose component actuating time compared with the cycle-out time elapsed; and small containing means located adjacent to said at least one section for containing said means comprising said controller, said means comprising said controller producing substantially no heat and being so compact as to minimize cooling requirements.

2. A programmable automatic controller for controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said controller comprising:

a first digital counter for generating a digital signal providing an instantaneous indication of the time elapsed in each cycle of operation of said machine;

a read/write memory for storing the relative times in a cycle of machine operation when each of the plurality of components is to be actuated;

internal clock pulse generating means, for generating clock pulses independent of said digital signal;

a second digital counter incremented by said clock pulse generating means, having an output connected to the address input of said read/write memory so that each of the locations in said read/write memory storing an actuating time is accessed each time a machine cycle clock pulse is generated;

comparator means responsive to the output of said read/write memory for comparing said digital signal corresponding to the times elapsed in each cycle with at least one relative component actuating time stored in said read/write memory, said comparator providing an actuating signal when a favorable comparison results;

addressing means, responsive to said second digital counter, receiving said actuating signal from said comparator means to provide a component operating command to the component whose component actuating time compared with the cycle time elapsed;

switching means capable of being mechanically set by an operator to a desired actuating time for varying the actuating time of selected components stored in said read/write memory to thereby change the relative times in each machine cycle when said selected components are to be actuated:

function select switch means having an output related to the location in said read/write memory of the actuating time that is desired to be changed;

second comparator means responsive to the output of said read/write memory and said function select switch means for comparing the function whose time is currently being accessed from said read/write memory with said output of said function select switch means, said comparator providing an indicating signal when a favorable comparison results;

logic gating means responsive to said indicating signal and controller conditions for gating the input data from said switching means to said read/write memory either the first time said indicating signal indicates a match if said section is stopped or after the next actuation of the selected function at the previous time setting if said section is running;

small containing means located adjacent to said at least one section for containing said means comprising said controller, said means comprising said controller producing substantially no heat and being so compact as to minimize cooling requirements.

3. A programmable automatic controller for controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said controller comprising:

a first digital counter for generating a digital signal providing an instantaneous indication of the time elapsed in each cycle of operation of said machine;

a read/write memory for storing the relative times in a cycle of machine operation when each of the plurality of components is to be actuated;

internal clock pulse generating means for producing clock pulses independent of said digital signal;

a second digital counter incremented by said clock pulse generating means, having an output connected to the address input of said read/write memory so that each of the locations in said read/write memory storing an actuating time is accessed each time a machine cycle clock pulse is generated;

comparator means, responsive to the output of said read/write memory for comparing said digital signal corresponding to the times elapsed in each cycle with at least one relative component actuating time stored in said read/write memory, said comparator providing an actuating signal when a favorable comparison results;

addressing means, responsive to said second counter, receiving said actuating signal from said comparator means for providing a component operating command to the component whose component actuating time compared with the cycle time elapsed;

a control switch means;

a central console having means capable of being set to a desired actuating time;

said control switch means and said central console including independently operable switching means capable of being mechanically set by an operator to the desired actuating time for varying the actuating time of selected components stored in said read/write memory to thereby change the times in each machine cycle when said selected components are to be actuated:

function select switch means having an output related to the location in said read/write memory of the actuating time that is desired to be changed;

second comparator means responsive to the output of said read/write memory and said function select switch means for comparing the function whose time is currently being accessed from said read/write memory with said output of said function select switch means, said comparator providing an indicating signal when a favorable comparison results;

logic gating means responsive to said indicating signal and controller conditions for gating the input data from said switching means to said read/write memory either the first time said indicating signal indicates a match if said section is stopped or after the next actuation of the selected function at the previous time setting if said section is running;

said switching means also including logic means having an override switch mounted on said central console for directing said logic gating means to accept data from said central console instead of said control switch means; and small containing means located adjacent to said at least one section for containing said means comprising said controller, said control switch means mounted on said small containing means located adjacent to each of said plurality of sections, said means comprising said controller producing substantially no heat and being so compact as to minimize cooling requirements.

4. A programmable automatic controller for controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said controller comprising:

timing means for generating a digital signal providing an instantaneous indication of the time elapsed in each cycle of operation of said machine;

random access storage means for storing the relative times in a cycle of machine operation when each of the plurality of components is to be actuated, said random access storage means comprising three 256×1 bit random-access memories and three serial to parallel shift registers, the input of each of said shift registers being connected respectively to the output of one of said random-access memories, the output of each of said shift registers being connected to a second comparator means;

each of said times stored in said random-access memory means being stored in twelve bits, four bits in each of said random-access memories;

switching means capable of being mechanically set by an operator to a desired actuating time for varying the actuating time of selected components stored in said storage means to thereby change the relative times in each machine cycle when selected components are to be actuated;

function select means for selecting the function whose actuating time is to be changed;

gating means for reading the setting on said switching means into said storage means;

means for cyclically reading out the contents of said storage means, said readout means including internal clock pulse generating means which increments on each pulse the address of said random-access memories being read out and clock's said shift register, and a second digital counter incremented by said clock pulse generating means having an output connected to the address input of said storage means so that each of the locations in said storage means storing an actuating time is accessed each time a machine cycle clock pulse is generated;

comparator means responsive to said readout means for comparing said digital signal corresponding to the times elapsed in each cycle with at least one relative component actuating time stored in said storage means, said comparator providing an actuating signal when a favorable comparison results;

addressing means receiving said actuating signal from said comparator means for providing a component operating command to the component whose component actuating time compared with the cycle time elapsed; and small containing means located adjacent to said at least one section for containing said means comprising said controller, said means comprising said controller producing substantially no heat and being so compact as to minimize cooling requirements.

5. A programmable automatic controller for controlling at least one section of a glassware forming machine, said at least one section including a plurality of movable components which operate in each of a plurality of machine cycles in timed relationship with respect to one another, said machine including machine cycle position indicating means for cyclically moving in synchronism with the cyclic operation of said machine, said controller comprising:

small containing means located adjacent to at least one section and including:

first timing means for generating a digital signal in synchronism with the movement of said cycle position indicating means, said digital signal providing an instantaneous indication of the time elapsed in each cycle of operation of said machine;

storage means for storing the relative times in a cycle of machine operation when each of the plurality of components is to be actuated, said storage means being a random-access memory for storing the relative times in a cycle of machine operation when each of the plurality of components of said section is to be actuated and having one location for storing the time said at least one section is delayed from said machine cycle;

means coupled to said storage means for selectively varying the actuating times of selected components stored in said storage means to thereby change the relative times in each machine cycle when said selected components are to be actuated;

means for reading out the contents of said storage means;

first comparator means responsive to said first timing means and said readout means for comparing said first digital signal corresponding to the time elapsed in each cycle with the time said section is delayed from said machine cycle, said first comparator means providing a first actuating signal when a favorable comparison results;

second timing means responsive to said first actuating signal and said machine cycle position indicating means for generating a second digital signal in synchronism with the movement of said cycle position indicating means, said second digital signal providing an instantaneous indication of the time elapsed in each cycle of said section;

second comparator means responsive to said readout means for comparing said second digital signal corresponding to the time elapsed in each section cycle with at least one relative component actuating time stored in said storage means, said second comparator means providing a second actuating signal when a favorable comparison results;

addressing means receiving said second actuating signal from said second comparator means for providing a component operating command to the component whose component actuating time compared with the cycle time elapsed; and said means comprising said controller producing substantially no heat and being so compact as to minimize cooling requirements.

6. The controller as in claim 5 wherein:

said random access memory means comprises three 256×1 bit random-access memories and three serial to parallel shift registers, the input of each of said shift registers being connected respectively to the output of one of said random-access memories, the output of each of said shift registers being connected to the comparator means;

each of said times stored in said random-access memory means are stored in 12 bits, 4 bits in each of said three random-access memories;

said readout means comprises an internal clock pulse generating means which increments on each pulse the address of said random-access memories being read out and clocks said shift register; and said second comparator means performs a comparison only after every fourth pulse from said generating means.

7. The controller of claim 5 further comprising means for controlling a plurality of machines wherein each of said machines operates in a preselected interdependent timed relationship with respect to one another.

8. The controller of claim 5 wherein said means for selectively varying the component actuating times comprises:

switching means capable of being mechanically set by an operator to the desired actuating time;

function select means for selecting the function whose actuating time is to be changed; and gating means for reading the setting on said switching means into said storage means.

9. The controller of claim 8 wherein said switching means comprises:

control switch means mounted on said small containing means;

a central console having means capable of being set to a desired actuating time; and logic means having an override switch mounted on said central console for directing said gating means to accept data from said central console instead of said control switch means.

10. A programmable automatic controller for controlling at least one section of a glassware forming machine, said at least one section including a plurality of movable components which operate in each of a plurality of machine cycles in timed relationship with respect to one another, said machine including machine cycle position indicating means for cyclically moving in synchronism with the cyclic operation of said machine, said controller comprising:

timing means for generating a digital signal in synchronism with the movement of said cycle position indicating means, said digital signal providing an instantaneous indication of the time elapsed in each cycle of operation of said machine;

random access memory means for storing the relative times in a cycle of machine operation when each of the plurality of components is to be actuated;

means coupled to said storage means for selectively varying the actuating times of selected components stored in said storage means to thereby change the relative times in each machine cycle when said selected components are to be actuated;

means for reading out the contents of said storage means;

comparator means responsive to said readout means for comparing the digital signal corresponding to the times elapsed in each cycle with at least one relative component actuating time stored in said storage means, said comparator providing an actuating signal when a favorable comparison results; and addressing means for receiving said actuating signal from said comparator means and for providing a component operating command to the component whose component actuating time compared with the cycle time elapsed; wherein said random access memory means comprises three random access memories and three serial to parallel shift registers, the input to each of said shift registers being connected, respectively, to the output of one of said random access memories, the output of each of said shift registers being connected to the comparator means, each of said times stored in said random access memory means being stored in 12 bits, 4 bits in each of said three random access memories; and wherein said readout means comprises an internal clock pulse generating means which increments on each pulse the address of said random access memories being read out and clocks said shift register.

11. The controller of claim 10 further comprising means for controlling a plurality of machines wherein each of said machines operates in a preselected interdependent timed relationship with respect to one another.

12. The controller as in claim 10 wherein said means for selectively varying the component actuating times comprises:

switching means capable of being mechanically set by an operator to the desired actuating time;

function select means for selecting the function whose actuating time is to be changed; and gating means for reading the setting on said switching means into said random access memory means.

13. The controller as in claim 10 wherein said timing means comprises a first digital counter, and wherein said readout means comprises:

internal clock pulse generating means; and a second digital counter incremented by said clock pulse generating means, having an output connected to the address input of said random access memory means so that each of the locations in said random access memory means storing an actuating time is accessed each time a machine cycle clock pulse is generated.

14. The controller as in claim 12 wherein said switching means comprises:

control switch means mounted on a small container located adjacent to each of said plurality of sections;

a central console having means capable of being set to a desired actuating time; and logic means having an override switch mounted on said central console for directing said gating means to accept data from said central console instead of said control switch means.

* * * * *